United States Patent [19]
Miller

[11] 3,814,870
[45] June 4, 1974

[54] TELEPHONE SUBSCRIBER LINE TERMINATING TEST CIRCUIT

[75] Inventor: Harry Lloyd Miller, Gaithersburg, Md.

[73] Assignee: Western Electric Company Inc., New York, N.Y.

[22] Filed: Sept. 19, 1972

[21] Appl. No.: 290,363

[52] U.S. Cl. .................... 179/175.2 B, 179/175.3 R
[51] Int. Cl. .......................... H04b 3/46, H04m 3/00
[58] Field of Search .............. 179/175, 175.1, 175.3, 179/18 HB, 6 AC, 6 E, 2 A, 175.2 B

[56] References Cited

UNITED STATES PATENTS

| | | | |
|---|---|---|---|
| 3,459,900 | 8/1969 | Alster et al. | 179/84 L |
| 3,530,250 | 9/1970 | Schaum et al. | 179/2 A |
| 3,548,102 | 12/1970 | Schaum et al. | 179/2 A |
| 3,641,270 | 2/1972 | Ohshima | 179/2 A |
| 3,723,656 | 3/1973 | Curtis et al. | 179/2 A |
| 3,739,107 | 6/1973 | Spencer | 179/175.3 |

*Primary Examiner*—Kathleen H. Claffy
*Assistant Examiner*—Douglas W. Olms
*Attorney, Agent, or Firm*—William H. Kamstra

[57] ABSTRACT

A telephone line terminating test circuit for simulating a subscriber line subset to provide a properly timed off-hook signal responsive to a ringing current applied to the line. During precutover testing of a telephone switching system, the test circuit connects a subset simulating resistance across the line under control of a thermal relay operated responsive to the ringing current to simulate an off-hook state. The thermal relay is delayed in both its operate and restore phases to provide proper testing periods.

3 Claims, 1 Drawing Figure

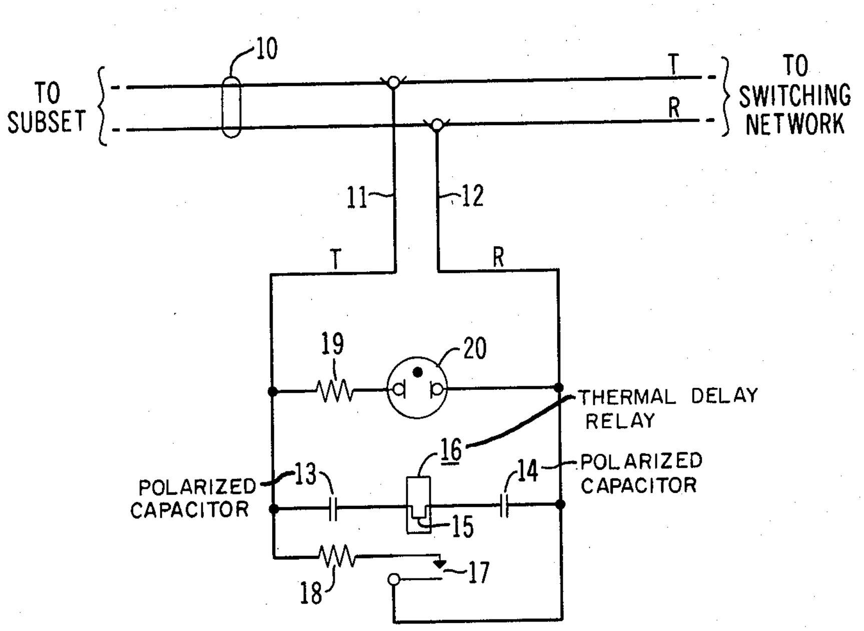
10
TO SUBSET
T
R
TO SWITCHING NETWORK
11
12
T
R
19
20
THERMAL DELAY RELAY
16
POLARIZED CAPACITOR
13
14
POLARIZED CAPACITOR
15
18
17

TELEPHONE SUBSCRIBER LINE TERMINATING TEST CIRCUIT

BACKGROUND OF THE INVENTION

This invention relates to telephone switching systems and particularly to apparatus and circuits for testing such systems prior to cutover.

After the installation of a telephone switching system in a central office and before it is placed in service, it is well known to test the system for its ability to carry out its various functions, particularly its ability correctly to set up and take down connections between calling and called subscriber lines of the office. This is also true in program controlled electronic systems where the central control must be tested to ensure, for example, that ringing current can be properly applied to a called line and that the system is instantly responsive to the called line off-hook state to trip the ringing. In addition, the system control must demonstrate its ability to process a volume of calls as established by operating standards. In order to test the system reliability in responding to requests for service, it is obviously impractical to ring each subscriber subset in the office from every other subset. According, some manner of simulating live traffic, originating and called line response, is conventionally employed to establish the integrity of the system control. In one known arrangement, an originating test set, operated under a test program control, originates calls to predetermined called subscriber lines through the switching network. In normal operation, after the identification of the called line, a ringing current source is controlled to apply an alternating ringing current to the called line to alert the subscriber. A direct current potential source in series with the ringing source provides a direct current in the subscriber line when the latter goes off-hook in response to the ringing to control the tripping of the ringing current.

Obviously, the system network control may be tested by test ringing actual subscriber subsets. Such a testing, however, would be slow, unreliable, and unnecessary to demonstrate system capabilities. Since it is the system control which is under test and not the individual subscriber lines, in practice, a termination is connected to a called line at its appearance at the central office test point. This termination simulates the subscriber's response to the ringing signals to trip the ringing and also returns to the on-hook signal. Heretofore a single termination test set for a programmed testing of a switching system has provided for the simultaneous termination of a large number of called lines to which it is individually connected. As a result, the equipment has been complicated and costly in addition to being cumbersome to transport from office to office. The termination test equipment has also been required to provide a power supply in order to return direct current off-hook signals to trip ringing.

It is accordingly an object of this invention to provide a novel circuit means for simulating a telephone subscriber line for test purposes which requires no power, other than ringing current provided by the system under test, is readily connected, and is extremely simple and inexpensive compared to circuits previously employed for accomplishing the same function.

SUMMARY OF THE INVENTION

In one illustrative embodiment of this invention a line terminating test circuit comprises a bridge connected across the ring and tip conductors of the testing called line. The bridge in turn comprises a pair of parallel branches, a first of which includes a pair of direct current blocking capacitors and a thermal relay operable responsive to a standard alternating ringing current. The other branch includes normally open contacts of the thermal relay and a 1,000 ohm resistor. When ringing current is applied to the line from the ringing current source of the switching system under control of the test program, after a short delay, the thermal relay closes its contacts to connect the resistor across the line to simulate the called line off-hook state and provide a ring trip circuit for the direct current now also applied to the line. Recognition of the ring trip by central control of the system indicates that a correct path through the network was established and that proper control of the ringing source exists. At the termination of the ringing current and again after a short delay, the relay contacts open which is read by central control as the called line reverting to its on-hook state. For its operation, the circuit requires only the direct current and its superimposed ringing current already present during the test operation and its few components may be readily packaged in a pocket-size unit.

BRIEF DESCRIPTION OF THE DRAWING

The organization and operation of a line terminating test circuit according to this invention will be better understood from a consideration of the detailed description of one illustrative embodiment thereof which follows when taken in conjunction with the accompanying drawing the single FIGURE of which depicts a line terminating test circuit connected to a portion of a typical telephone subscriber line appearance at a central office.

DETAILED DESCRIPTION

One illustrative line terminating test circuit according to this invention is shown in the drawing as connected across the tip and ring conductors of a typical telephone subscriber line 10. Only a representative portion of a line is shown and it will be appreciated that, at one end, the line is extended through a main distributing frame to the switching network of the telephone system. The line is also extendable by means of the network to a ringing circuit and supervisory circuits of the system also not shown as being well known in the art. Typical central office equipment with which the test circuit of this invention is advantageously adapted for use is described, for example, in *The Bell System Technical Journal* (BSTJ) Vol. 43, September 1964, at pages 2,485 et seq., where is also specifically described the manner of generating the alternating and direct currents of a character to which the circuit of this invention responds as will be considered hereinafter. At the other end, the line 10 is assumed to be extended to a distant subscriber subset the presence of which the test circuit of this invention is intended to simulate.

The line terminating test circuit depicted in the drawing is connected by corresponding tip and ring conductors 11 and 12, respectively, to the tip and ring conductors of the line 10 at the main distributing frame of the central office in any convenient temporary manner such as by commercially available miniature clips, for example. Connected in series between the conductors 11 and 12 is a first and a second polarized capacitor 13 and 14 having connected therebetween a winding 15 of a thermal relay 16. Make contacts 17 of the relay 16 are serially connected in a second circuit bridging the conductors 11 and 12, which second circuit also includes a resistor 18. Finally, a third circuit bridging the conductors 11 and 12 includes a resistor 19 and an alternating current responsive neon lamp 20.

With the test circuit of this invention connected as described, an illustrative load test operation may now be considered. Live traffic is simulated by establishing through the network, not shown, a call to the subscriber line 10 by means of originating test equipment previously mentioned. When the called line has been identified by the central control of the system, a ringing circuit, also not shown, is connected thereto in a conventional manner as described in the above-cited BSTJ text. The ringing circuit applies the usual 20 Hz ringing signal to the line for 2 second periods alternating with 4 second silent intervals. Instead of energizing the ringer windings as would be the case in calling an actual subscriber subset, the ringing current follows two paths between conductors 11 and 12 of the test circuit. The direct current path being open at the contacts 17, the ringing current energizes both the winding 15 of thermal relay 16 and discharges neon lamp 20. The relay 16, which in practice conveniently comprises one providing a delay of from one to two 2-second ringing periods after the initiation of the ringing current, operates its contacts 17 only after that delay period. This delay period conveniently provides a settling in time for other circuit elements the operation of which must be positively assured during the test. During this delay, supervisory direct current is blocked by capacitors 13 and 14. When the contacts 17 are finally closed a direct current path through resistor 18 is presented to the supervisory direct current of the system, the magnitude of which current is detected as an off-hook state of the line. The resistor 18 presents approximately 1,000 ohms to simulate the direct current resistance of the subset of the line called. The test program controls central control responsive to the off-hook state to operate a ring trip delay to cut off the ringing current. At this time the contacts 17 are not immediately released; the thermal relay 16 also provides a delay on de-energizing and the direct current path is retained for a short period to ensure that adequate test indications have been read by central control. When the contacts 17 are permitted to open, the direct current supervisory path is also opened, which is read by central control as the called line reverting to its on-hook state. Had the ringing circuit not been tripped by the operation of relay 16, a trouble printout would have been executed by the test program to indicate that the proper connection had not been established by central control.

The line terminating test circuit of this invention is intended for the simultaneous load testing of a large number of lines. Accordingly, many of the circuits are clipped at one time to the subscriber line appearances on a main distributing frame. To facilitate the simultaneous testing operation, visual indication of the circuit response to an applied ringing current is provided by an alternating current responsive neon lamp 20 also serially connected across the tip and ring conductors 11 and 12 with a resistance 19. As subscriber lines are rung, the response of the line terminating circuits may thus be determined at a glance. The employment of polarized capacitors 13 and 14 on either side of relay 16 permits flexibility in connecting the circuit to a subscriber line other than directly across the tip and ring conductors as assumed in the foregoing.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. A telephone subscriber line terminating test circuit for simulating a telephone subset during testing of a switching system having a source of ringing current and means for tripping said source of current responsive to an off-hook condition of said subset, said test circuit comprising a bridge circuit detachably connectable across the tip and ring conductors of said line, said bridge including a pair of parallel branches, one of said parallel branches including a thermal delay relay means and direct current blocking capacitor means, the other of said parallel branches including a resistor of a value substantially equal to the direct current resistance of said subset in its off-hook state, said other of said parallel branches also including relay make contacts controlled by said relay means, said relay means closing said contacts after a predetermined interval responsive to the presence of ringing current applied to said line to connect said resistor across said line to simulate said off-hook condition to trip said source of ringing current, said relay means restoring said contacts after a second predetermined interval responsive to the termination of said ringing current.

2. A telephone line terminating test circuit comprising a bridge circuit detachably connectable across a subscriber line, said bridge circuit including a first parallel branch including a thermal delay relay means and direct current blocking capacitor means comprising a polarized capacitor included on either side of said relay means and a second parallel branch including normally open contacts controlled by said relay means and resistor means simulating the direct current resistance of a telephone line subset, said relay means being operable responsive to ringing current applied to said line to cause a delayed closing of said contacts to simulate an off-hook condition of said subscriber line.

3. In combination in a telephone switching system having a plurality of subscriber lines, a source of ringing current, and control means for applying said ringing current to a selected one of said lines and for terminating said ringing current responsive to an off-hook condition of said line: a line terminating test circuit for simulating said selected line comprising a bridge circuit adapted for temporary connection across the conductors of said selected line, said bridge circuit including a first parallel path including a thermal delay relay means operated responsive to said ringing current and a first and a second polarized capacitor included on opposite sides of said relay means; and a second parallel path including resistance means substantially equal to the direct current resistance of the subset of said selected line and relay make contacts controlled by said thermal delay relay means.

* * * * *